United States Patent
Hayashi (10) Patent No.: US 6,913,125 B2
(45) Date of Patent: Jul. 5, 2005

(54) DAMPER

(75) Inventor: Ken Hayashi, Aichi-ken (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 10/662,348

(22) Filed: Sep. 16, 2003

(65) Prior Publication Data

US 2004/0099495 A1 May 27, 2004

(30) Foreign Application Priority Data

Nov. 27, 2002 (JP) ........................................ 2002-343284

(51) Int. Cl.[7] ............................................. F16D 57/00
(52) U.S. Cl. ............................... 188/290; 16/51; 16/54; 188/306
(58) Field of Search ................................ 188/290–296, 188/322.5, 306, 308, 310, 130; 16/54, 50, 256, 255, 273, 277, 284, 303, 330, 51, 52, 82; 379/433.13; 4/248, 246.2, 240, 236; 455/575.3, 575.1; 464/24; 74/574; 296/97.12

(56) References Cited

U.S. PATENT DOCUMENTS

2004/0181909 A1 * 9/2004 Kawamoto ................... 16/330

FOREIGN PATENT DOCUMENTS

| JP | 0 458 454 | 4/1991 |
| JP | 5-89993 | 12/1993 |
| JP | 9-291957 | 11/1997 |
| JP | 2002-310132 | 10/2002 |
| JP | 2004-176806 | * 6/2004 |

OTHER PUBLICATIONS

STIC translation of JP5–89993.*
STIC translation of JP9–291957.*
STIC translation of JP 2002–310132.*

* cited by examiner

Primary Examiner—Douglas C. Butler
(74) Attorney, Agent, or Firm—Manabu Kanesaka (57) ABSTRACT

A damper includes a housing having a cylindrical shape and filled with a viscous fluid, a first rotor rotatably received in the housing and having a first connecting portion formed at an end portion thereof, and a second rotor rotatably housed in the housing coaxially with the first rotor and having a second connecting portion formed at an end portion thereof. The first and second connecting portions engage to allow the first and second rotors together, and forms a space therebetween to allow the viscous fluid to pass therethrough. An elastic member urges the first connecting portion and the second connecting portion to connect together, and accumulates an elastic force in a state that the connection between the first and second connecting portions is released.

8 Claims, 7 Drawing Sheets

DAMPER

BACKGROUND OF THE INVENTION AND RELATED ART STATEMENT

The present invention relates to a damper.

Figure 7:
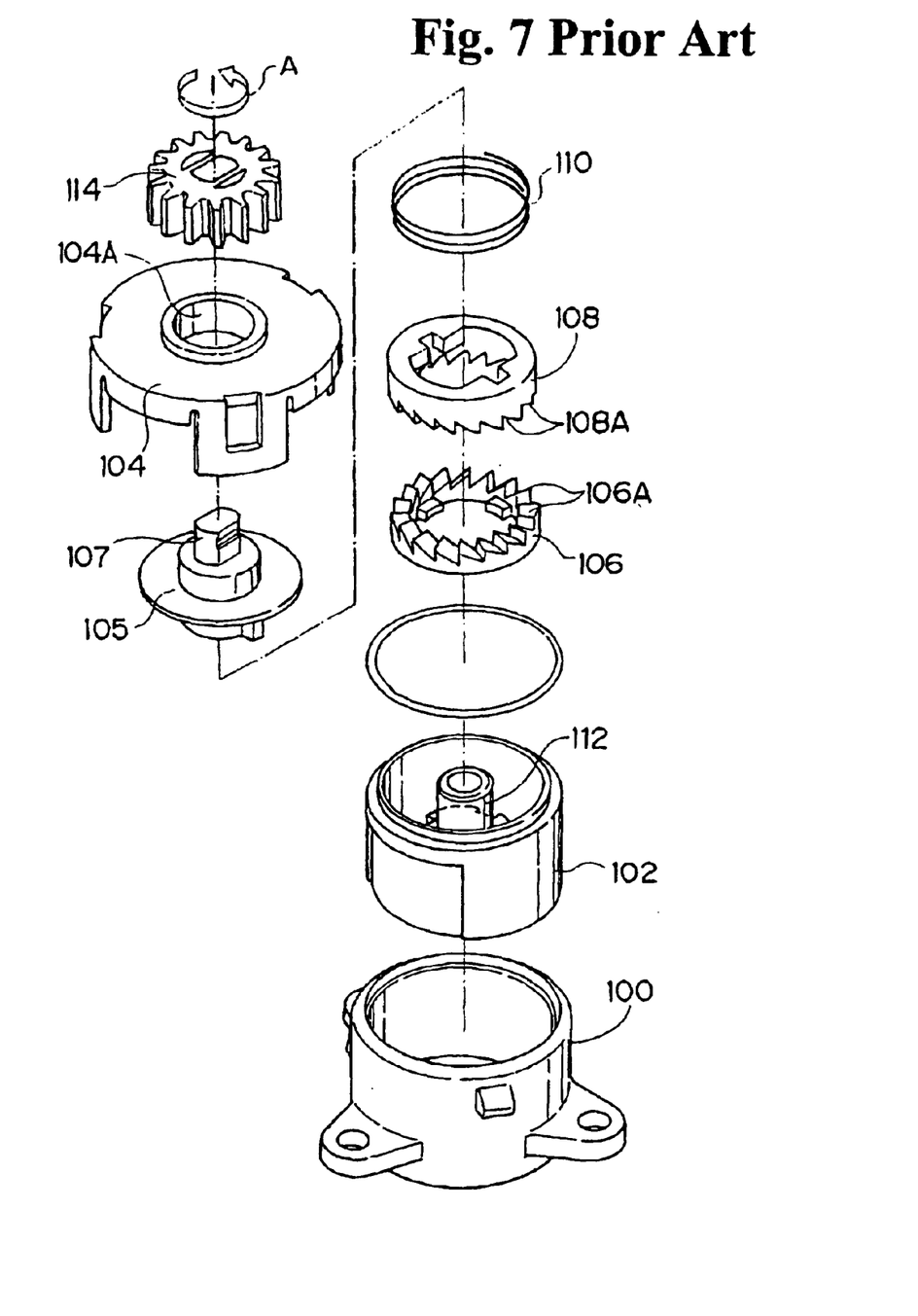
FIG. 7 is an exploded perspective view showing a conventional damper.

In Patent Reference No. 1, as shown in FIG. 7, a rotor 102 is disposed in a body case 100, and a silicone grease as a viscous fluid is filled in a space between the body case 100 and the rotor 102 sealed by a cap 104.

The rotor 102 is provided with a clutch disc 106 to be rotatable with the rotor. Another clutch disc 108 is provided on an upper part of the clutch disc 106. Incidentally, a lid member 105 can engage the cap 104, and an engaging portion 107 projecting from the lid member 105 is exposed through a through-hole 104A formed at the center of the cap 104.

Also, the clutch disc 108 is attached to a back surface of the lid member 105 so that the clutch disc 108 can rotate with the lid member 105 and move in an axial direction of the lid member 105. Further, a coil spring 110 is disposed between the back surface of the lid member 105 and the clutch disc 108 for urging the clutch disc 108 to a side of the clutch disc 106.

Here, a spur wheel 114 is fixed to the engaging portion 107 of the lid member 105 to transmit a rotational force from the spur wheel 114. Therefore, when the spur wheel 114 is rotated in an arrow direction A, a teeth portion 106A of the clutch disc 106 engages a teeth portion 108A of the clutch disc 108 to thereby rotate the rotor 102. Thus, the rotor 102 receives a viscous resistance due to the silicone grease to damp the rotation of the spur wheel 114 through the clutch discs 106 and 108.

On the other hand, when the spur wheel 114 is rotated in the direction opposite to the arrow direction A, since the teeth portion 106A of the clutch disc 106 does not engage the teeth portion 108A of the clutch disc 108, the clutch disc 108 moves in the axial direction of the lid member 105. Thus, the clutch disc 106 rotates idly with respect to the clutch disc 108, and the rotor 102 does not rotate. Therefore, the spur wheel 114 is rotated without receiving the viscous resistance.

Therefore, it is possible to apply or release the braking force to the braking member through the engagement between the spur wheel and a gear at the braking member side, not shown.

However, in the damper described above, the number of parts and assembling work are increased, thereby increasing a cost. Also, by using the clutch discs 106 and 108 with the teeth portions 106A and 108A, when the rotational force is transmitted to the clutch disc 106 from the driving clutch plate 108, there may be a time lag depending on an engagement state of the teeth portions 106A and 108A.

Patent Reference No. 1

Japanese Utility Model (Jikkai) No. 05-89993 (refer to Pages 9–13, FIG. 1)

In view of the above problems, the present invention has been made, and an object of the invention is to provide a damper, wherein a torque can be changed according to a rotational direction with a simple structure.

Further objects and advantages of the invention will be apparent from the following description of the invention.

SUMMARY OF THE INVENTION

According to the first aspect of the invention, a damper includes: a housing having a cylindrical shape and filled with a viscous fluid; a first rotor rotatably received in the housing and receiving a rotational force from an outside; a first connecting portion formed at an end portion of the first rotor; a second rotor rotatably housed in the housing coaxially with the first rotor; a second connecting portion formed at an end portion of the second rotor for allowing the second rotor to rotate with the first rotor when the second connecting portion is connected with the first connecting portion formed at the end portion of the first rotor, and for forming a space between the second connecting portion and the first connecting portion to allow a viscous fluid to pass through the space when the second connecting portion is released from the first connecting portion; and an elastic member for urging the first connecting portion and the second connecting portion to connect together in a rotating direction and for accumulating an elastic force in a state that the connection between the first and second connecting portions is released.

In the first aspect of the invention, when the first connecting portion is connected with the second connecting portion, the first rotor and the second rotor rotate together. Here, the viscous fluid is filled in the housing, and there is the space between outer peripheral surfaces of the first and second rotors and an inner peripheral surface of the housing.

Thus, when the first rotor and the second rotor are integrally rotated in the housing, the viscous fluid flows through the space. Therefore, the viscous fluid generates flow resistance to thereby apply a braking force to a rotational force transmitting member for transmitting the rotational force of the first rotor.

Also, when the first connecting portion is released from the second connecting portion to form the space therebetween, the viscous fluid passes through the space. Thus, the flow resistance by the viscous fluid is reduced, so that the braking force acting on the rotational force transmitting member is reduced.

Here, the elastic force is accumulated in the elastic member in a state that the connection between the first and the second connecting portions is released. Therefore, when a force in a direction for releasing the connection between the first and second connecting portions is released, the elastic member is restored to return to an original state, and the first and second connecting portions are connected.

As described above, the first and second connecting portions are connected or disconnected according to the rotational direction of the first rotor, thereby changing torque. Thus, the damper can be used as a so-called one-way damper.

Also, the elastic force is accumulated in the elastic member in a state that the rotational force transmitting member transmits the rotational force. Thus, when the rotational force transmitting member stops rotation, the first and second connecting portions are connected by the restoring force of the elastic member.

Therefore, as compared with a damper using a clutch disc system with a teeth portion, there is no time lag when the braking force acts on the rotational force transmitting member. Also, it is not necessary to employ a complicated clutch mechanism, thereby reducing the number of parts, assembling work and a cost.

According to the second aspect of the invention, the elastic member is a coil spring. When the first rotor is rotated in a direction for accumulating the elastic force in the coil spring, the flow resistance of the viscous fluid generated at the space between the outer peripheral wall of the second rotor and the inner peripheral surface of the housing, and a space between the first and the second connecting portions, is larger than the urging force of the coil spring. When the first rotor is stopped, the flow resistance of the viscous fluid generated at the space between the outer peripheral wall of the second rotor rotated by the restoring force of the coil spring and the inner peripheral surface of the housing, and the space between the first and second connecting portions, is smaller than the restoring force.

In the second aspect of the invention, when the first rotor is rotated in the direction for accumulating the elastic force in the coil spring, the flow resistance generated at the space between the outer peripheral wall of the second rotor and the inner peripheral surface of the housing, and the space between the first and second connecting portions, is larger than the urging force of the coil spring. Accordingly, the connection between the first and second connecting portions is released.

Also, the flow resistance of the viscous fluid generated at the space between the outer peripheral wall of the second rotor rotated by the restoring force of the coil spring and the inner peripheral surface of the housing, and the space between the first and second connecting portions, is smaller than the restoring force of the coil spring. Accordingly, when the first rotor is stopped, the second rotor is rotated by the restoring force of the spring to thereby connect the first and second connecting portions.

According to the third aspect of the invention, projecting portions project from the outer peripheral surfaces of the first and second rotors, respectively, to thereby form a space between front-end surfaces of the projecting portions and the inner peripheral surface of the housing.

Since the projecting portions are provided on the outer peripheral surfaces of the first and the second rotors, when the first rotor and the second rotor are rotated, the viscous resistance is generated further at sidewalls of the projecting portions. Therefore, an additional braking force of the viscous resistance is applied to the rotational force transmitting member for transmitting the rotational force to the first rotor.

Also, since the projecting portions are provided on the outer peripheral surfaces of the first and second rotors, respectively, shear resistance generated between the front-end surfaces of the projecting portions and the inner peripheral surface of the housing is increased.

According to the fourth aspect of the invention, the projecting portions are provided at symmetric positions on the outer peripheral surfaces of the first and second rotors. As the projecting portions are provided at the symmetrical positions on the outer peripheral surfaces of the first and second rotors, it is possible to adjust a balance of the viscous resistance and the flow resistance when the first and second rotors rotate.

According to the fifth aspect of the invention, the connecting surfaces for connecting the first and second connecting portions are formed in inclined surfaces with respect to the rotating shaft of the first and second rotors. Thus, in the state that the connection between the first and second connecting portions is released, the viscous fluid passing through the space between the connecting surfaces can smoothly flow, thereby preventing the viscous fluid from staying at the connecting surfaces.

According to the sixth aspect of the invention, walls project from the inner peripheral surface of the housing to thereby form a space between the outer peripheral surfaces of the first and second rotors and the walls. The walls form two liquid chambers to flow the viscous fluid therethrough.

As the interior of the housing is divided into the two liquid chambers, when the first and second rotors are integrally rotated, volumes of the divided areas are reduced by the rotating movement of the projecting portions of the first and second rotors to thereby increase a compressibility ratio of the viscous fluid.

Thus, the projecting portions of the first and second rotors have a high torque by receiving a reaction force through compression of the viscous fluid. Therefore, the braking force of the damper can be increased.

Also, when the first and second rotors are integrally rotated, the viscous fluid having a high internal pressure due to the compression flows through the space between the front-end surfaces of the walls and the outer peripheral surfaces of the first and second rotors, and the space between the front-end surfaces of the projecting portions of the first and second rotors and the inner peripheral surface of the housing.

Therefore, the shear resistance generated at the front-end surfaces of the projecting portions of the first and second rotors and the outer peripheral surfaces of the first and second rotors facing the front-end surfaces of the walls is increased. Therefore, a further high torque can be obtained and the braking force of the damper can be further increased.

Here, a higher torque can be obtained when the torque generating portion is positioned outwards as far as possible from the rotating center of the first and second rotors. Therefore, it is preferred that the space between the front-end surfaces of the projecting portions of the first and second rotors and the inner peripheral surface of the housing is larger than that between the front-end surfaces of the walls and the outer peripheral surfaces of the first and second rotors. Also, the walls are provided on the inner peripheral surface of the housing, so that the rotating angle of the first and second rotors can be controlled.

According to the seventh aspect of the invention, concave/convex portions are provided on the inner peripheral surface of the housing to thereby change the space between the front-end surface of the projecting portions and the inner peripheral surface of the housing. Thus, the torque can be changed by not only the rotational direction but also the rotational angle.

BRIEF DESCRIPTION OF THE DRAWINGS

FIGS. 4(A) and 4(B) are perspective views showing the damper according to the present invention, wherein FIG. 4(A) shows an upper portion and FIG. 4(B) shows a lower portion;

FIGS. 5(A)–5(C) are perspective views showing the upper and lower portions of the damper according to the invention, wherein FIG. 5(A) shows a state that the upper and lower portions are connected, FIGS. 5(B) and 5(C) show states that the upper portion is released from the lower portion;

FIGS. 6(A) and 6(B) are sectional views of a housing of the damper according to the invention, wherein FIG. 6(A) shows a shape of an inner peripheral surface of the housing, and FIG. 6(B) shows a modified example thereof.

DETAILED DESCRIPTION OF PREFERRED EMBODIMENTS

Hereunder, a damper according to an embodiment of the present invention will be described.

Figure 1:
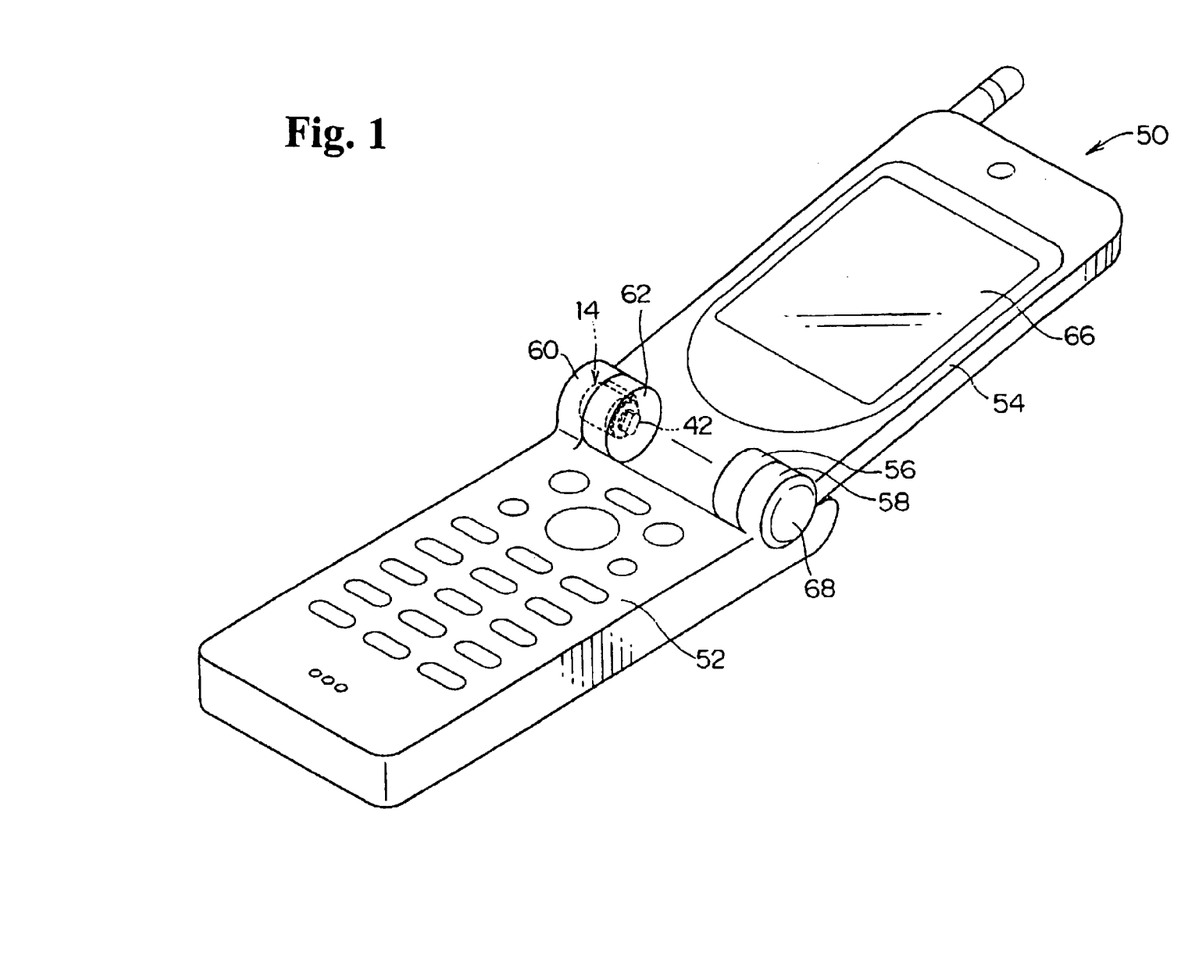
FIG. 1 is a perspective view showing a mobile phone to which a damper according to the present invention is applied.

FIG. 1 shows a mobile phone 50 to which a damper 14 according to the present embodiment is applied. The mobile phone 50 is formed of a transmitting-side main portion 52 and a receiving-side main portion 54. The mobile phone 50 includes a pair of shaft portions 56, 58 and 60, 62. Therefore, the receiving-side main portion 54 can rotate with respect to the transmitting-side main portion 52, so that the mobile phone 50 is folded in a state that the receiving-side main portion 54 is closed.

A spring, not shown, is provided at a side of the shaft portion 56, 58 for urging the receiving-side main portion 54 in a direction to open with respect to the transmitting-side main portion 52. On the other hand, a damper 14 is provided at a side of the shaft portion 60, 62, so that a braking force acts on opening of the receiving-side main portion 54.

Next, a structure of the damper 14 will be explained.

Figure 2:
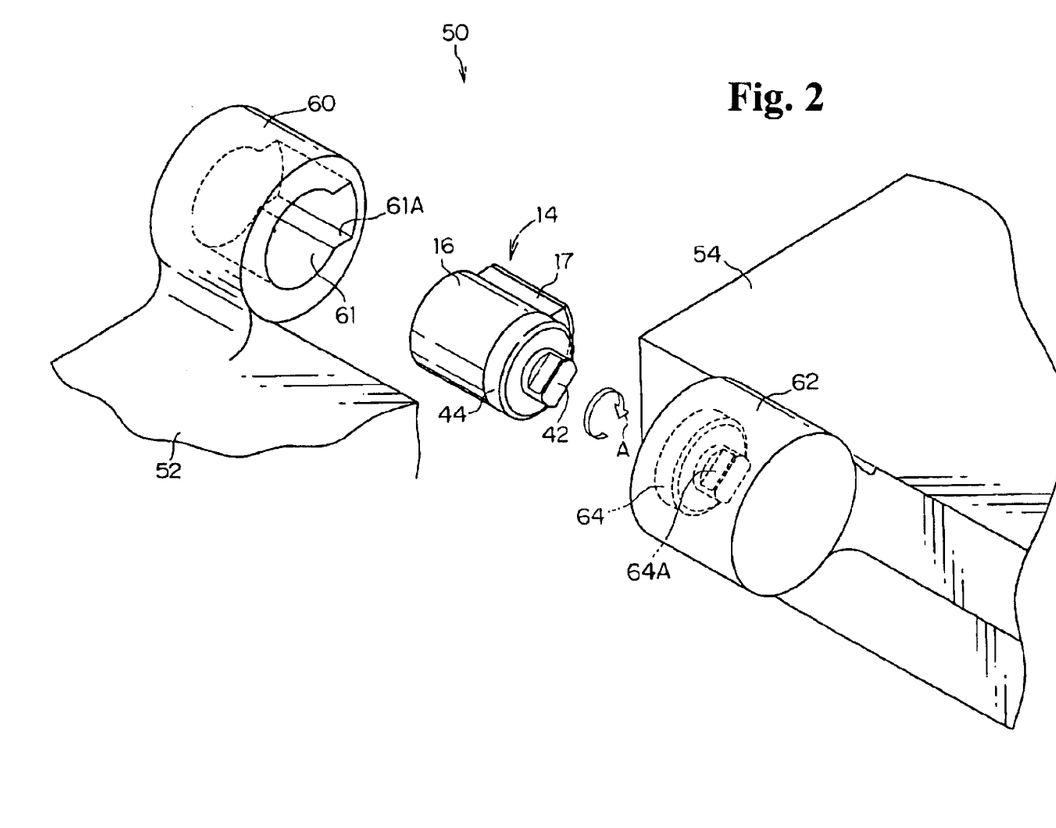
FIG. 2 is an exploded perspective view showing the damper and a shaft portion of the mobile phone according to the present invention.

As shown in FIG. 2, the damper 14 includes a housing 16 having an approximately cylindrical shape with a bottom portion. A positioning protrusion 17 is provided on an external wall of the housing 16 along an axial direction of the housing 16.

Also, an approximately cylindrical lower portion 20 (second rotor) can be received in the housing 16. As shown in FIG. 4(B), projecting portions 22 are formed symmetrically at an outer peripheral surface of the lower portion 20 at one end side of the lower portion 20. The projecting portions 22 have upper surfaces having a height gradually decreasing along an arrow direction B, and moving toward one end side of the lower portion 20.

Each of the projecting portions 22 is formed of a connecting portion 24 having a connecting surface 24A with a step at an upper surface thereof, and a connecting portion 26 having a flat connecting surface 26A at an upper surface thereof. The connecting portion 24 extends outwardly more than the connecting portion 26. Also, front-end surfaces of the connecting portions 24, 26 are formed in a circular arc shape and are concentric with the outer peripheral surface of the lower portion 20.

Also, a concave portion (not shown) is provided at the center of the one end surface of the lower portion 20 for receiving a fixed shaft (not shown) projecting from the center of the bottom of the housing 16 (refer to FIG. 3) to be rotatably supported with respect to the housing 16.

Figure 4A:
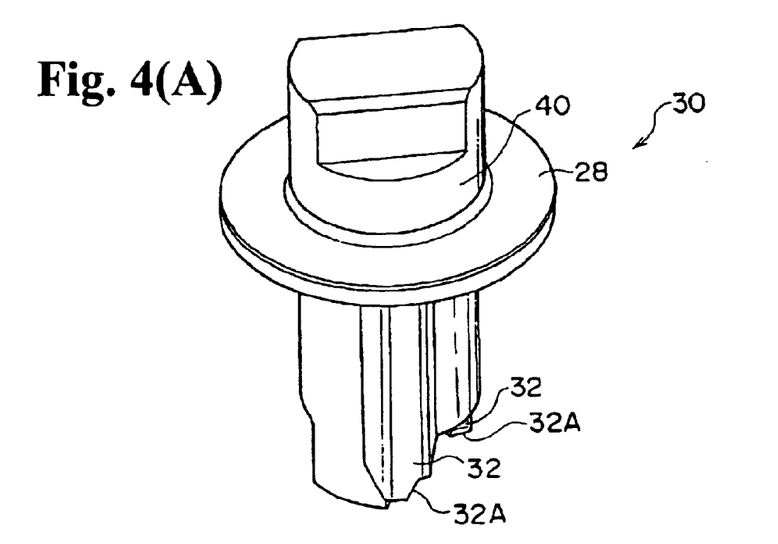
Figure 4B:
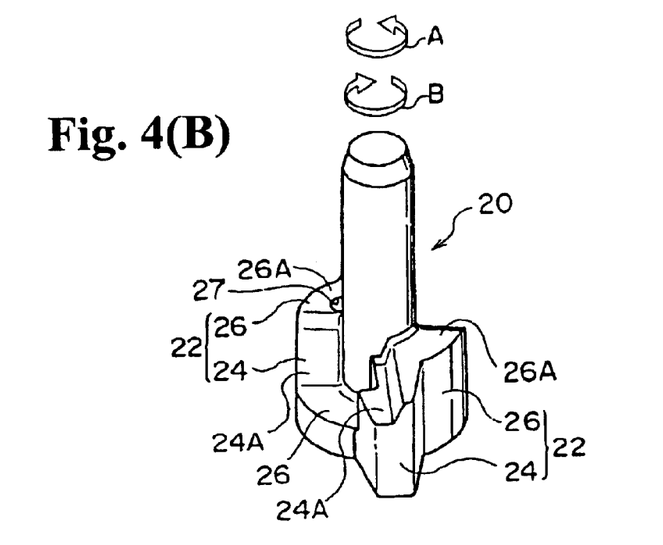

On the other hand, as shown in FIGS. 4(A) and 4(B), an upper portion 30 (first rotor) having an approximately cylindrical shape and provided with a large diameter lid portion 28 at one end side thereof can be inserted into the other end side of the lower portion 20.

An outer diameter of the upper portion 30 is approximately the same as a distance between front-end surfaces of the connecting portions 26. An outer peripheral surface of the upper portion 30 is on the same plane with the front-end surfaces of the connecting portions 26 of the lower portion 20 in a state that the upper portion 30 is inserted into the lower portion 20.

Also, projecting portions 32 are formed symmetrically on the outer peripheral surface at the other end side of the upper portion 30, and the projecting portions 32 have front-end surfaces with a circular arc shape and concentric with the outer peripheral surface of the upper portion 30.

A distance between the front-end surfaces of the projecting portions 32 is approximately the same as that between the front-end surfaces of the connecting portions 24. Also, a connecting surface 32A with a step is formed on a lower surface of the projecting portion 32, so that the connecting surface 32A makes a surface contact with the connecting surface 24A of the lower portion 20.

As described above, in a state that the connecting surfaces 32A of the upper portion 30 make the surface contact with the connecting surfaces 24A of the lower portion 20, the front-end surface of the projecting portion 32 of the upper portion 30 is on the same plane with the front-end surface of the connecting portion 24 of the lower portion 20.

Figure 3:
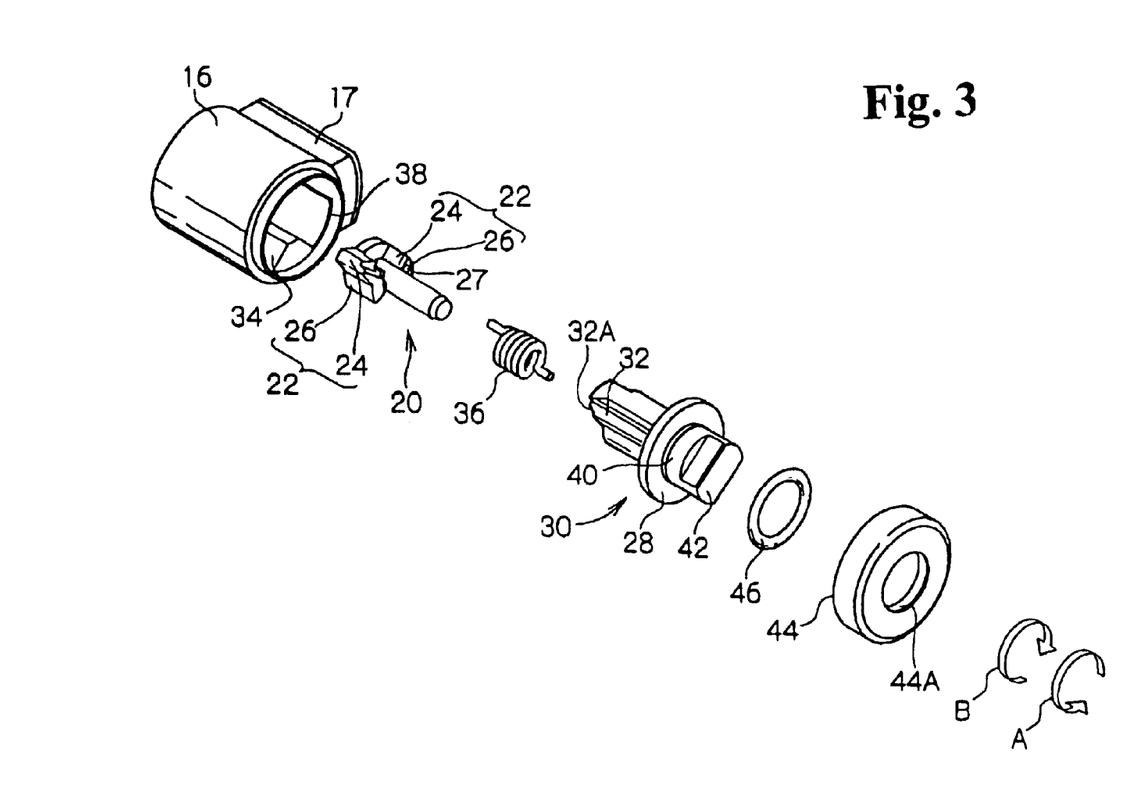
FIG. 3 is an exploded perspective view showing the damper according to the present invention.
Figure 6A:
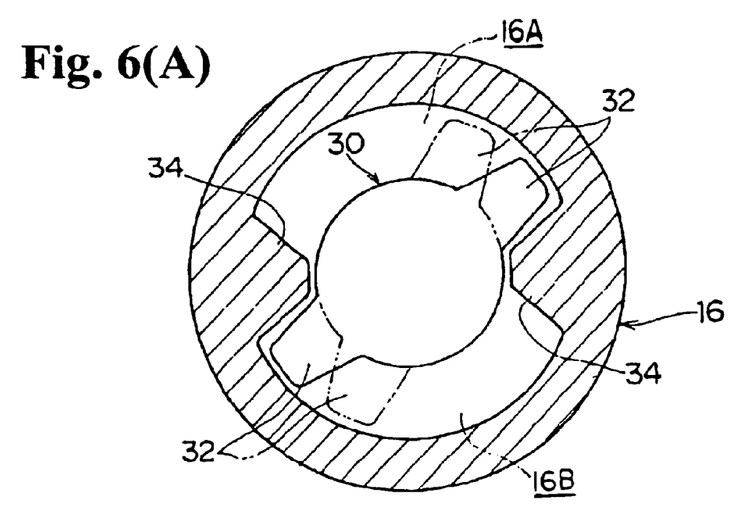

On the other hand, as shown in FIGS. 3 and 6(A), a pair of partition walls 34 extending in an axial direction is provided at positions facing each other on the inner peripheral surface of the housing 16, so that the interior of the housing 16 is divided into two liquid chambers 16A and 16B.

Also, the projecting portions 32 of the upper portion 30 and the connecting portions 24 of the lower portion 20 abut against the partition walls 34, respectively (in order to be easily understood, only the outer peripheral surface and the projecting portions 32 of the upper portion 30 are shown).

Also, a space is provided between the outer peripheral surfaces of the upper portion 30 and the lower portion 20 and the front-end surfaces of the partition walls 34. The liquid chamber 16A is communicated with the liquid chamber 16B through the space to thereby allow the viscous fluid to pass.

The space between the inner peripheral surface of the housing 16 and the front-end surfaces of the projecting portions 32 of the upper portion 30 and the connecting portions 26 of the lower portion 20, is set to be slightly larger than that between the outer peripheral surfaces of the upper portion 30 and the lower portion 20 and the front-end surfaces of the partition walls 34.

On the other hand, a spring receiving portion (not shown) having a diameter larger than that of the lower portion 20 is provided at an inner edge side of the upper portion 30 to thereby receive a coil spring 36 therein. One end of the coil spring 36 is fixed to the spring receiving portion side of the upper portion 30, and the other end thereof is fixed to an attaching hole 27 formed in the connecting portion 26 of the lower portion 20. Accordingly, the coil spring 36 urges in the direction that the connecting surfaces 32A of the upper portion 30 make a surface contact (i.e. connect the projecting portions 32 and the connecting portions 24) with the connecting surfaces 24A of the lower portion 20.

Figure 5A:
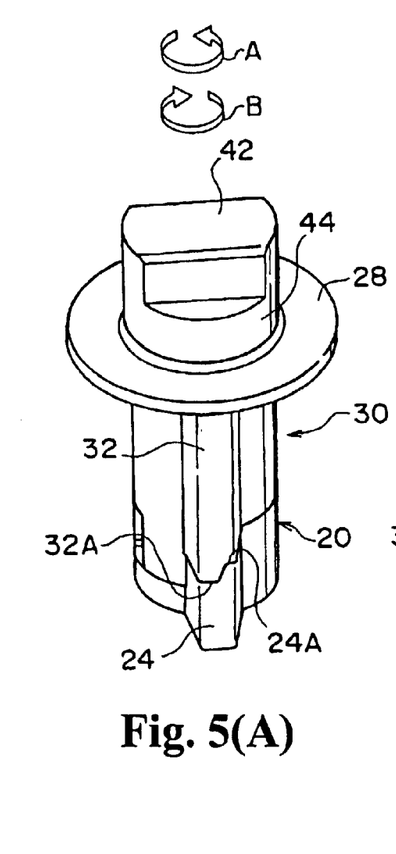
Figure 5B:
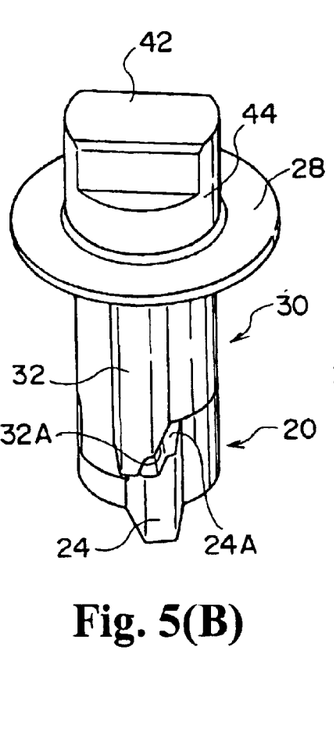
Figure 5C:
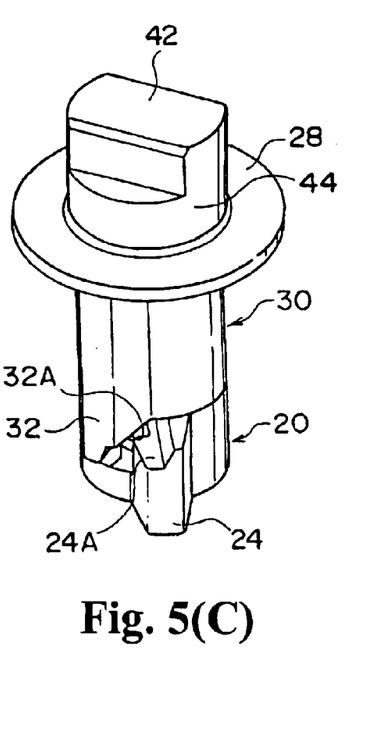

Here, when the upper portion 30 is rotated in the arrow direction B, the urging force of the coil spring 36 is set to be smaller than the flow resistance generated at the space (refer to FIGS. 5(B) and 5(C)) between the front-end surfaces of the projecting portions 22 of the lower portion 20 and the inner peripheral surface of the housing 16, and the space between the connecting surfaces 32A of the projecting portions 32 and the connecting surfaces 24A of the connecting portions 24. Accordingly, the connection between the projecting portion 32 and the connecting portion 24 is released.

Also, a restoring force of the coil spring 36 is set to be larger than the flow resistance of the viscous fluids generated at the space between the front-end surfaces of the projecting portions 22 of the lower portion 20 and the inner peripheral surface of the housing 16, and the space between the projecting portions 32 and the connecting portions 24. As shown in FIG. 5(C), when the rotation of the upper portion 30 is stopped, the lower portion 20 is rotated in the arrow direction B by the restoring force of the coil spring 36 to thereby connect the projecting portions 32 to the connecting portions 24.

On the other hand, as shown in FIG. 3, the lid portion 28 provided at the one end side of the upper portion 30 has an outer diameter approximately same as an inner diameter of the housing 16 to be received therein. A step 38 is formed at an opening side of the inner peripheral surface of the housing 16 so that when the lid portion 28 is received in the housing 16, the lid portion 28 abuts against the step 38 to thereby position.

Also, a column-shaped seat 40 is provided on an upper surface of the lid portion 28, and an approximately elliptical engaging projection 42 is formed on an upper surface of the seat 40. The viscous fluid can be filled in the housing 16.

Therefore, an approximately cylindrical cap 44 is fixed on the opening side of the housing 16 by welding or the like. The cap 44 includes a hole portion 44A at the center thereof so that the seat 40 can be inserted. In a state that the cap 44 is fixed to the housing 16, the seat 40 and the engaging projection 42 are exposed.

An O-ring 46 is mounted on an outer peripheral surface of the seat 40. In a state that the hole portion 44A is inserted to the seat 40, a space between the seat 40 and the hole portion 44A is closed to thereby seal the housing 16.

Incidentally, as shown in FIG. 2, the shaft portion 60 of the transmitting-side main portion 52 of the mobile phone 50 includes an approximately column-shape concave portion 61 to receive the housing 16 of the damper 14 therein. A positioning concave portion 61A is formed in the concave portion 61 in the axial direction of the shaft portion 60, and can engage the positioning projection 17 of the damper 14.

On the other hand, the shaft portion 62 of the receiving-side main portion 54 includes a column-shaped concave portion 64 so that the cap 44 of the damper 14 can be fitted therein. The column-shaped concave portion 64 is provided with an engaging concave portion 64A at a bottom thereof to engage the engaging projection 42 exposed from the cap 44.

Therefore, the housing 16 is fixed to the shaft portion 60 by fitting the housing 16 into the concave portion 61 in a state that the positioning projection 17 engages the positioning concave portion 61A. Also, the cap 44 is inserted into the column-shape concave portion 64, so that the engaging projection 42 engages the engaging concave portion 64A.

Accordingly, the shaft portion 62 can be rotated with respect to the damper 14, so that the receiving-side main portion 54 is rotated with respect to the transmitting-side main portion 52. When the receiving-side main portion 54 is opened or closed, the engaging projection 42 is rotated through the shaft portion 62.

Incidentally, the spring, not shown, is disposed at the shaft portion 56, 58 side as shown in FIG. 1, and urges the receiving-side main portion 54 in the opening direction with respect to the transmitting-side main portion 52. Therefore, when the receiving-side main portion 54 is closed, the receiving-side main portion 54 is pressed against the urging force of the spring.

Thus, when the receiving-side main portion 54 is closed, the receiving-side main portion 54 is controlled to close not rapidly, so that a display 66 provided in the receiving-side main portion 54 does not receive an impact so as not to be damaged. Also, when the receiving-side main portion 54 is closed, an elastic force is accumulated in the springs.

On the shaft portion 56, 58 side as shown in FIG. 1, a locking device, not shown, is disposed. When the receiving-side main portion 54 is closed, the locking device maintains the locking state, and the locking state can be released by pressing a button portion 68 provided in the locking device.

Therefore, when the locking state is released by pressing the button portion 68, the receiving-side main portion 54 is opened by the restoring force of the spring. At this time, the braking force of the damper 14 is acted through the engaging projection portion 42 integrally rotating with the shaft portion 62.

Next, an operation of the damper according to the present embodiment will be explained.

As shown in FIGS. 1 and 3, when the receiving-side main portion in the open state is closed, the rotational force in the arrow direction B is transmitted to the upper portion 30 through the engaging projection portion 42 integrally rotated with the shaft portion 62.

On the other hand, the viscous resistance by the viscous fluid is applied to the sidewalls of the connecting portions 24 projecting from the lower portion 20. Also, the flow resistance (shear resistance) is generated by the viscous fluid passing through the space between the front-end surfaces of the projecting portions 22 and the inner peripheral surface of the housing 16. As shown in FIGS. 3, 5(B) and 5(C), the flow resistance is generated by the viscous fluid passing through the space between the connecting surfaces 32A of the projecting portions 32 provided to the upper portion 30 and the connecting surfaces 24A of the connecting portions 24 of the lower portion 20. The resistance described above is applied to the lower portion 20. The viscous resistance and flow resistance are larger than the urging force of the coil spring 36 (refer to FIG. 3).

Therefore, only the upper portion 30 is rotated in the arrow direction B, and the connecting state (i.e., a state where the connecting surfaces 32A of the projection portions 32 and the connecting surfaces 24A of the connecting portions 24 make a surface contact) of the projecting portions 32 and the connecting portions 24 is released.

Accordingly, the space is provided between the connecting surfaces 32A and the connecting surfaces 24A, and the viscous fluid flows through the space to thereby reduce the flow resistance by the viscous fluid, so that the upper portion 30 rotates idly.

Thus, the braking force acted on the receiving-side main portion 54 through the shaft portion 62 (refer to FIG. 1) becomes small. At this time, the elastic force is accumulated in the coil spring 36 to thereby reduce a diameter thereof.

On the other hand, when the receiving-side main portion 54 (refer to FIG. 1) is closed, the viscous resistance is generated by the viscous fluid, and is applied to the sidewalls of the projecting portions 22 projecting from the lower portion 20. Also, the shear resistance is generated by the viscous fluid passing through the space between the front-end surfaces of the projecting portions 22 and the inner peripheral surface of the housing 16. Further, the flow resistance is generated by the viscous fluid passing through the space between the projecting portions 32 and the connecting portions 24. The resistance described above is smaller than the urging force of the coil spring 36. Therefore, the lower portion 20 is rotated by the restoring force of the coil spring 36, and the projecting portions 32 and connecting portions 24 are connected to thereby integrate the lower portion 20 and the upper portion 30 (refer to FIG. 5(A)).

Next, when the locked state by the locking device, not shown, is released by pressing the button portion 68 as shown in FIG. 1, the receiving-side main portion 54 is urged in the opening direction through the shaft portion 56 by the restoring force of the spring, not shown, disposed at the side of the shaft portion 56, 58. At this time, as shown in FIGS. 2 and 5(A), the rotational force in the arrow direction A is transmitted to the engaging projection 42 through the shaft portion 62.

Therefore, although the rotational force in the arrow direction A is transmitted to the upper portion 30, since the upper portion 30 and the lower portion 20 are integrated at this time, the projecting portions 32 and the connecting portions 24 are integrally rotated in a state that they are connected.

As described above, since the upper portion 30 and the lower portion 20 rotate integrally, it is possible to obtain the viscous resistance by the viscous fluid applied to the sidewalls of the projecting portions 32 of the upper portion 30 and the projecting portions 22 of the lower portion 20, and the shear resistance generated by the viscous fluid passing through the space between the inner peripheral surface of the housing 16 and the front-end surfaces of the projecting portions 32 and the connecting portions 24.

Therefore, the rotation of the upper portion 30 is damped, and the braking force is applied to the receiving-side main portion 54 through the upper portion 30 and the shaft portion 62.

Here, the connecting surfaces 32A of the projecting portions 32 of the upper portion 30 and the connecting surfaces 24A of the connecting portions 24 of the lower portion 20 have the surfaces inclined toward the lower surface side of the lower portion 20 along the arrow direction B. Therefore, there is no case that only the upper portion 30 is rotated in the arrow direction A.

Next, an operation of the damper according to the present embodiment will be explained.

As shown in FIGS. 1, 5(B) and 5(C), when the receiving-side main portion 54 of the opened mobile phone 50 is closed, the connection between the projecting portions 32 of the upper portion 30 and the connecting portions 24 of the lower portion 20 in the damper 14 is released to provide the space between the connecting surfaces 32A of the projecting portions 32 and the connecting surfaces 24A of the connecting portions 24.

Thus, the viscous fluid passes through the space to reduce the flow resistance by the viscous fluid, and the braking force acted on the receiving-side main portion 54 is reduced. Also, when the receiving-side main portion 54 is opened, as shown in FIG. 5(A), the projecting portions 32 and connecting portions 24 are connected to integrally rotate the upper portion 30 and the lower portion 20.

Figure 6B:
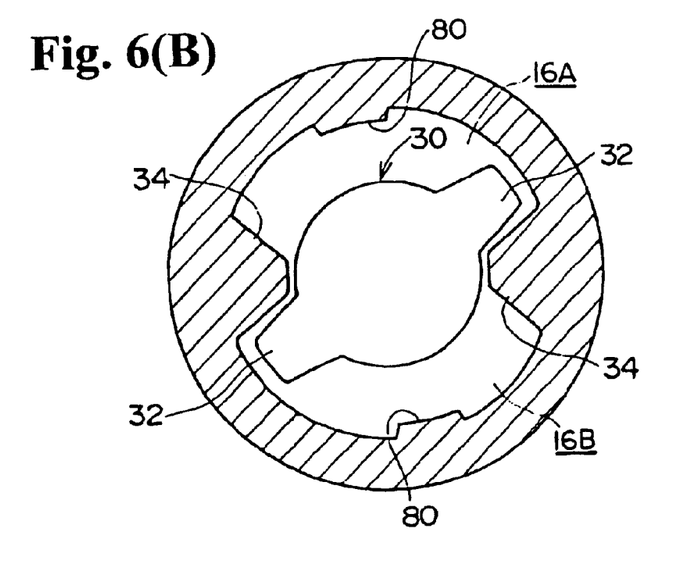

Thus, by the viscous resistance of the viscous fluid applied to the sidewalls of the projecting portions 32 and connecting portions 24 (in FIGS. 6(A) and 6(B), to be easily understood, only the outer peripheral surface and the projecting portions 32 of the upper portion 30 are shown) as shown in FIGS. 3, 6(A) and 6(B), and the shear resistance generated by the viscous fluid passing through the space between the inner peripheral surface of the housing 16 and the front-end surfaces of the projecting portions 32 and the connecting portions 24, the braking force acted on the receiving-side main portion 54 (refer FIG. 1) can be increased.

As described above, the projecting portions 32 and the connecting portions 24 are connected or disconnected according to the rotational direction of the upper portion 30, so that the torque can be easily changed.

Therefore, when the receiving-side main portion 54 is closed, the braking force of the damper 14 is reduced so that the receiving-side main portion 54 can be closed with a small force. Also, when the receiving-side main portion 54 is opened, the braking force of the damper 14 is increased, so that the receiving-side main portion 54 can be quietly opened and the display 66 provided in the receiving-side main portion 54 does not receive an impact and is not damaged.

Incidentally, when the receiving-side main portion 54 in the open state is closed, the elastic force in the coil spring 36 is accumulated. The projecting portions 32 and the connecting portions 24 are connected by the restoring force of the coil spring 36 in a state that the receiving-side main portion 54 is closed. Thus, the braking force acts on the receiving-side main portion 54 during a period from when the button 68 of the locking device of the mobile phone 50 is pressed to when the receiving-side main portion 54 is completely opened.

Therefore, as compared with a damper having the clutch disc system with a teeth portion, there is no time lag until the braking force acts on the receiving-side main portion 54. Also, a complicated clutch mechanism is not required, thereby reducing the number of parts, the assembling work, and a cost.

Also, as shown in FIG. 6(A), the projecting portions 32 and the connecting portions 24 project from the outer peripheral surfaces of the upper portion 30 and the lower portion 20 at the symmetrical positions. When the upper portion 30 and the lower portion 20 are rotated, the viscous resistance by the viscous fluid is generated on the sidewalls of the projecting portions 32 and the connecting portions 24, so that the braking force by the viscous resistance is applied to the receiving-side main portion 54 transmitting the rotational force to the upper portion 30.

Also, the projecting portions 32 and the connecting portions 24 extend from the outer peripheral surfaces of the upper portion 30 and the lower portion 20, respectively. Thus, the shear resistance generated at the space between the inner peripheral surface of the housing 16 and the front-end surfaces of the projecting portions 32 and the connecting portions 24 can be increased.

Here, the projecting portions 32 and the connecting portions 24 extend from the outer peripheral surfaces of the upper portion 30 and the lower portion 20 at the symmetrical positions, respectively. Thus, it is possible to adjust a balance of the viscous resistance and flow resistance when the upper portion 30 and the lower portion 20 rotate.

However, the projecting portions 32 and the connecting portions 24 are not necessarily required to extend from the outer peripheral surfaces of the upper portion 30 and the lower portion 20 at the symmetrical positions. A single projecting portion 32 and a single connecting portion 24 may be provided on the outer peripheral surfaces of the upper portion 30 and the lower portion 20.

On the other hand, as shown in FIGS. 4(A) and 4(B), the connecting surfaces 32A of the projecting portions 32 of the upper portion 30 and the connecting surfaces 24A of the connecting portions 24 of the lower portion 20 have steps, and the connecting surfaces 32A and the connecting surfaces 24A are inclined toward the lower surface side of the lower portion 20 along the arrow direction B. However, it is sufficient to stop only the upper portion 30 from rotating in the arrow direction A, and the present invention is not limited thereto. For example, the connecting surfaces 32A and 24A may be formed in inclined surfaces.

When the connecting surfaces 32A and 24A are formed in inclined surfaces, the viscous fluid passing through the connecting surfaces 32A and 24A can smoothly flow, so that the viscous fluid does not stay at the connecting surfaces 32A and 24A.

Also, as shown in FIGS. 3 and 6(A), the pair of the partition walls 34 projects from the inner peripheral surface of the housing 16 in the axial direction to thereby divide the housing 16 into the two liquid chambers 16A and 16B.

Accordingly, when the upper portion 30 and the lower portion 20 are integrally rotated, the volumes of the divided liquid chambers 16A and 16B are reduced by the rotational movement of the projecting portions 32 of the upper portion 30 and the connecting portions 24 of the lower portion 20 to thereby increase a compressibility ratio of the viscous fluid.

Therefore, the projecting portions 32 of the upper portion 30 and the connecting portions 24 of the lower portion 20 receive a reaction force due to the compression of the viscous fluid, respectively, to obtain a high torque, thereby increasing the braking force of the damper 14.

Also, when the upper portion 30 and the lower portion 20 are integrally rotated, the viscous fluid having a high internal pressure due to the compression flows through the space between the front-end surfaces of the partition walls 34 and the outer peripheral surfaces of the upper portion 30 and the lower portion 20, and the space between the front-end surfaces of the projecting portions 32 of the upper portion 30 and the connecting portions 24 of the lower portion 20 and the inner peripheral surface of the housing 16.

Therefore, the shear resistance generated at the space between the front-end surfaces of the projecting portions 32 of the upper portion 30 and the connecting portions 24 of the lower portion 20, and the space between the outer peripheral surfaces of the upper portion 30 and the lower portion 20 facing the front-end surfaces of the partition walls 34, is increased. Therefore, a further high torque is expected, and the braking force of the damper 14 can be further increased.

Here, the space between the inner peripheral surface of the housing 16 and the front-end surfaces of the projecting portions 32 of the upper portion 30 and the connecting portions 24 of the lower portion 20 is made slightly larger than that between the outer peripheral surfaces of the upper portion 30 and the lower portion 20 and the front-end surfaces of the partition walls 34.

Therefore, the torque generating portion is positioned at the outer side as far as possible from a rotational center of the upper portion 30 and the lower portion 20 to thereby obtain a higher torque. Also, the rotational angle of the upper portion 30 and the lower portion 20 can be controlled by providing the walls on the inner peripheral surface of the housing 16.

Incidentally, in the present embodiment, the space between the front-end surfaces of the projecting portions 32 and the connecting portions 24 and the inner peripheral surface of the housing 16 is constant. However, as shown in FIG. 6(B), the space between the front-end surfaces of the projecting portions 32 and the connecting portions 24 (in the embodiment, to be easily understood, only the outer peripheral surface of the upper portion 30 and the projecting portions 32 are shown in the drawing) and the inner peripheral surface of the housing 16 may be varied by providing convex portions 80 (or concave portions) on the inner peripheral surface of the housing 16. Thus, the torque applied to the receiving-side main portion 54 can be adjusted by not only the rotational direction but also the rotational angle.

Also, the space between the front-end surfaces of the projecting portions 32 and the connecting portions 24 and the inner peripheral surface of the housing 16 may be varied by changing a projecting height of the projecting portions 32 and the connecting portions 24. For example, the space between the front-end surfaces of the connecting portions 24 and the inner peripheral surface of the housing 16 may be made larger than that between the front-end surfaces of the projecting portions 32 and the inner peripheral surface of the housing 16. Thus, when the receiving-side main portion 54 (refer to FIG. 1) is closed, the lower portion 20 is connected with the upper portion 30 with a small viscous resistance and flow resistance.

Incidentally, in the present embodiment, the damper according to the present invention is applied to the mobile phone. The present invention is not limited thereto since the damper is simply connected to the rotational force transmitting member to which the braking force is applied.

According to the first aspect of the invention, with the structure as described above, it is possible to change the torque by connecting or disconnecting the first connecting portions and the second connecting portions according to the rotational direction of the first rotor. Thus, the damper can be used as the so-called one-way damper.

Also, as compared with the clutch disc system having the teeth portion, since the first connecting portions of the first rotor and the second connecting portions of the second rotor are connected, there is no time lag until the braking force is acted on the rotational force transmitting member. Further, it is not necessary to use a complicated clutch mechanism, thereby reducing the number of parts, the assembling work, and a cost.

According to the second aspect of the invention, when the first rotor is rotated against the urging force of the coil spring, the flow resistance generated at the space between the outer peripheral wall of the second rotor and the inner peripheral surface of the housing, and the space between the first connecting portions and the second connecting portions, is larger than the urging force of the coil spring. Therefore, the connecting state of the first connecting portions and the second connecting portions is released.

Also, when the first rotor is stopped, the flow resistance of the viscous fluid generated at the space between the outer peripheral wall of the second rotor rotated by the urging force of the coil spring and the inner peripheral surface of the housing, and the space between the first connecting portions and the second connecting portions, is smaller than the urging force of the coil spring. Therefore, the second rotor is rotated by the urging force of the coil spring to thereby connect the first connecting portions to the second connecting portions.

According to the third aspect of the invention, the braking force by the viscous resistance can be added to the rotational force transmitting member for transmitting the rotational force to the first rotor. Also, the shear resistance generated at the space between the front-end surfaces of the projecting portions and the inner surface of the housing can be increased.

According to the fourth aspect of the invention, it is possible to adjust the balance of the viscous resistance and the flow resistance when the first rotor and the second rotor rotate. In the fifth aspect of the invention, in the state that the connection between the first connecting portions and the second connecting portions is released, the viscous fluid passing through the space between the connecting surfaces can smoothly flow, so that the viscous fluid does not stay at the connecting surfaces.

According to the sixth aspect of the invention, when the first and second rotors are integrally rotated, the volumes in the divided chambers are reduced and the compressibility ratio of the viscous fluid increases by the rotational movement of the projecting portions of the first and second rotors. Therefore, the projecting portions of the first and second rotors receive the reaction force due to the compression of the viscous fluid to thereby obtain a high torque and increase the braking force of the damper.

Also, when the first and second rotors are integrally rotated, the viscous fluid having a high internal pressure generated due to the compression flows through the space between the front-end surfaces of the walls and the outer peripheral surfaces of the first and second rotors, and the space between the front-end surfaces of the projecting portions of the first and second rotors and the inner peripheral surface of the housing. Therefore, the shear resistance generated at the front-end surfaces of the projecting portions of the first and second rotors, and at the outer peripheral surfaces of the first and second rotors facing the front-end surface of the wall, increases. Thus, a higher torque can be expected and the braking force of the damper can be further increased.

According to the seventh aspect of the invention, the torque can be adjusted by not only the rotational direction but also the rotational angle.

While the invention has been explained with reference to the specific embodiments of the invention, the explanation is illustrative and the invention is limited only by the appended claims.

What is claimed is:

1. A damper comprising:
    a housing having a cylindrical hollow shape;
    a viscous fluid filled in the housing;
    a first rotor rotatably retained in the housing for receiving a rotational force from outside the housing, and having a first connecting portion formed on a side surface extending along an axis of the first rotor at one end portion thereof;
    a second rotor rotatably retained in the housing coaxially with the first rotor, and having a second connecting portion formed on a side surface extending along an axis of the second rotor at one end portion thereof for allowing the second rotor to rotate together with the first rotor when the second connecting portion is connected with the first connecting portion, said second connecting portion forming a first space in a peripheral direction between the first connecting portion and the second connecting portion when the second connecting portion is released from the first connecting portion so that the viscous fluid passes through the space; and
    an elastic member disposed in the housing for urging the first rotor and the second rotor in the peripheral direction to connect with each other, said elastic member accumulating an elastic force when the first and second connecting portions move away from each other.

2. A damper comprising:

a housing having a cylindrical hollow space;

a viscous fluid filled in the housing;

a first rotor rotatably retained in the housing for receiving a rotational force from outside the housing, and having a first connecting portion formed at one end portion thereof;

a second rotor rotatably retained in the housing coaxially with the first rotor, and having a second connecting portion formed at one end portion thereof for allowing the second rotor to rotate together with the first rotor when the second connecting portion is connected with the first connecting portion, said second connecting portion forming a first space between the first connecting portion and the second connecting portion when the second connecting portion is released from the first connecting portion so that the viscous fluid passes through the space; and an elastic member disposed in the housing for urging the first rotor and the second rotor in a direction to connect with each other, said elastic member accumulating an elastic force when the first and second connecting portions move away from each other;

wherein said elastic member is a coil spring having an urging force smaller than a flow resistance of the viscous fluid generated at the first space and a second space between an outer peripheral wall of the second rotor and an inner peripheral surface of the housing when the first rotor is moved away from the second connecting portion, said elastic force of the coil spring as a restoring force being greater than the flow resistance of the viscous fluid generated at the first space and the second space when the first rotor is stopped and the second rotor is rotated by the restoring force of the coil spring.

3. A damper comprising:

a housing having a cylindrical hollow shape;

a viscous fluid filled in the housing;

a first rotor rotatably retained in the housing for receiving a rotational force from outside the housing, and having a first connecting portion formed at one end portion thereof;

a second rotor rotatably retained in the housing coaxially with the first rotor, and having a second connecting portion formed at one end portion thereof for allowing the second rotor to rotate together with the first rotor when the second connecting portion is connected with the first connecting portion, said second connecting portion forming a first space between the first connecting portion and the second connecting portion when the second connecting portion is released from the first connecting portion so that the viscous fluid passes through the space;

an elastic member disposed in the housing for urging the first rotor and the second rotor in a direction to connect with each other, said elastic member accumulating an elastic force when the first and second connecting portions move away from each other; and a projecting portion projecting from an outer peripheral surface of at least one of the first rotor and the second rotor, said projecting portion having a front-end surface to form a space with respect to an inner peripheral surface of the housing.

4. A damper as claimed in claim 3, wherein said projecting portion includes projections formed symmetrically on the outer peripheral surface of the at least one of the first rotor and the second rotor with respect to a center axis thereof.

5. A damper as claimed in claim 1, wherein said first connecting portion and said second connecting portion include connecting surfaces for connecting together, said connecting surfaces being inclined relative to the axei of the first rotor and the axis of the second rotor.

6. A damper as claimed in claim 1, wherein said housing further includes walls projecting from an inner peripheral surface thereof for forming two liquid chambers in the housing so that the viscous fluid can pass therethrough, said walls having end portions with a predetermined distance away from outer peripheral surfaces of the first rotor and the second rotor.

7. A damper as claimed in claim 3, wherein said housing includes the inner peripheral surface having concave and convex portions for changing distances between the front-end surface of the projecting portion and the inner peripheral surface.

8. A damper as claimed in claim 1, wherein said first and second rotors are engaged with and disengaged from each other in the peripheral direction without moving in axial directions thereof.

* * * * *